United States Patent [19]

Riethmuller

[11] Patent Number: 4,606,102

[45] Date of Patent: Aug. 19, 1986

[54] PROCESS FOR REPAIRING LABYRINTH SEAL FLANGES

[75] Inventor: Jean R. L. Riethmuller, Chilly, France

[73] Assignee: S.N.E.C.M.A., Paris, France

[21] Appl. No.: 719,251

[22] Filed: Apr. 2, 1985

[30] Foreign Application Priority Data

Apr. 19, 1984 [FR] France ................................ 84 05274

[51] Int. Cl.$^4$ .......................... B23P 15/00; B23P 6/00; B21D 3/14
[52] U.S. Cl. .......................... 29/156.8 R; 29/156.4 R; 29/283.5; 29/402.02; 29/402.05; 29/402.06; 29/402.19; 29/557; 29/DIG. 19; 72/98; 72/102; 415/170 R; 416/174
[58] Field of Search .................... 29/156.4 R, 156.8 R, 29/156.8 B, 157.3 A, 240, 283.5, 402.02, 402.05, 402.06, 402.19, 557, DIG. 19; 72/98, 102; 277/53; 415/170 R, 172 R, 172 A, 174; 416/174

[56] References Cited

U.S. PATENT DOCUMENTS

| 3,846,899 | 11/1974 | Gross | 29/402.02 X |
| 4,028,788 | 5/1977 | DeMusis | 29/156.8 B |
| 4,285,108 | 8/1981 | Arrigoni | 29/156.8 B |

FOREIGN PATENT DOCUMENTS 25482 11/1964 Japan ..................................... 72/98

Primary Examiner—Howard N. Goldberg
Assistant Examiner—R. S. Wallace
Attorney, Agent, or Firm—Bacon & Thomas

[57] ABSTRACT

The invention relates to a process and an apparatus for repairing worn labyrinth seal flanges. The seal flanges are repaired by spin-forming them to increase their radial height to at least equal that of an unworn labyrinth seal. A tool for carrying out the process has a pair of parallel rollers displaced a constant distance which is advanced radially inwardly over the seal flange so as to deform the sides and cause the material to creep in a radially outward direction to increase the height of the flange. The flange may be ground to remove any residual defects caused by the spin-forming operation.

9 Claims, 4 Drawing Figures

PROCESS FOR REPAIRING LABYRINTH SEAL FLANGES

FIELD OF THE INVENTION

The present invention relates to a process for repairing excessively-worn labyrinth seal flanges, such as those utilized in turbojet engines. The invention also relates to a tool for carrying out this process.

BRIEF DESCRIPTION OF THE PRIOR ART

Labyrinth seals are, of course, well-known in the art and, as utilized in turbojet engines, may comprise a plurality of annular flanges made of a heat-resistant alloy whose tips or peripheral surfaces define a shape of revolution. The flanges bear against, or otherwise interact with a surface to prevent the undesired flow of a gas between the two elements. The labyrinth seal flanges may be attached to a rotating part and bear against a stationary part, or vice versa. The operational conditions underwhich the labyrinth seals must function in turbojet engines cause the tips or peripheral surfaces of the seal flanges to wear, thereby reducing their radial height. As this reduction in radial height occurs, the effectiveness of the labyrinth seal is reduced.

In order to prevent the complete destruction of the labyrinth seals, which are somewhat expensive to replace, they may be overhauled or repaired when the wear of the seal flanges exceeds a given value (usually between 0.3 and 0.8 mm).

U.S. Pat. No. 4,028,788 to De Musis describes a method for refurbishing turbine blade air seal flanges wherein additional material is added to the worn flanges by electrical welding. The flanges are then machined to their final dimensions. While this method may achieve satisfactory results, it results in a fairly large loss of the material utilized to rebuild the seal flanges.

U.S. Pat. No. 3,846,899 to Gross describes a method of constructing a labyrinth seal wherein the individual seal flanges may be replaced when worn beyond a certain level. The process defined by Gross is costlier insofar as it entails both costly machining and specially-formed parts to accomodate the new seal flanges. Furthermore, this method may introduce defects or errors into the seal flange, which will not become apparent until the bearing part has been installed and is rotating at high speeds.

U.S. Pat. No. 4,285,108 to Arrigoni describes an apparatus and method for refinishing turbine blade seals wherein the worn seal flange is ground off and a repair flange is attached to the stub of the original flange. The new flange is then ground to the proper contour and the part is reinstalled.

SUMMARY OF THE INVENTION

The process defined by the present invention allows the repair of labyrinth seal flanges without wasting the material constituting the seal flanges, without the danger of the replacement flange coming loose from the engine part, and without complex and costly machining. This process is characterized in that the radial height of the seal flanges, which has been reduced by wear, is returned to its original effective height by spin forming on a lathe.

While spin forming on a lathe, per se, is a well-known procedure, it has never been utilized to overhaul or repair labyrinth seal flanges. This spinning technique has been primarily used to shape conico-cylindrical parts from a thick walled blank without having to resort to intermediary thermal treatment.

In a preferred mode of carrying out the invention, the engine part bearing the worn seal flanges is mounted in a lathe and is driven in constant speed rotation at a suitalbe rate. While the part is being rotated, the seal flanges are consecutively subjected to a spin-forming operation which may comprise contacting each flange with a suitable tool which is displaced radially inwardly so as to deform the sides of the seal flange and thereby cause its height to increase. The tool may have a pair of rollers spaced apart a distance which is less than the minimum axial width of the seal flange such that, as the rollers are forced along the sides of the flange, it is suitably deformed so as to increase its radial height.

The rotational speed of the part, the radial advance distance and rate of the tool, and the thickness and separation of the two rollers may be varied depending upon the dimensions and the particular material hardness of the seal flanges. The tool is preferably kept in its maximum radially advanced position for a pre-determined amount of time prior to its retraction so as to stabilize the shape of the seal flange. However, defects may remain in the sides and the peripheral surface of the seal flanges. These may be removed by grinding the peripheral surface to remove any of the defects and to form the seal flange with a finished diameter. Similarly, the defects in the sides may be eliminated by a further operation, such as honing.

The invention also involves a tool for carrying out the process which may comprise two rollers rotatably retained on a shaft and having a spacer mounted between them to maintain their spaced position. The shaft may be attached to the tool carrier of the lathe such that it can be moved radially and axially with respect to the rotating part.

DETAILED DESCRIPTION OF THE PREFERRED EMBODIMENT

Figure 1:
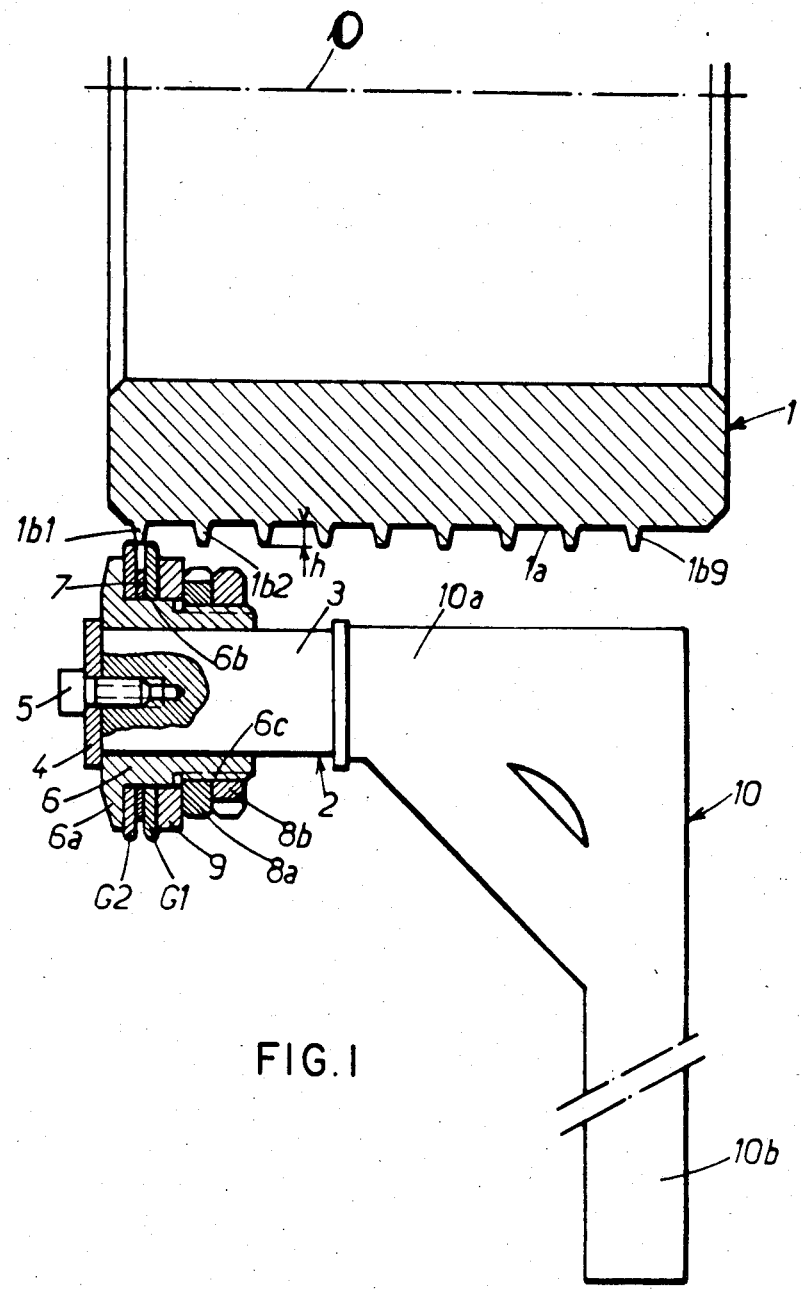
FIG. 1 is a side view, partially in section, showing the tool according to the present invention in operative relationship with respect to a part having a plurality of seal flanges.

As best seen in FIG. 1, a turbojet engine part 1 is shown which has a cylindrical outer surface $1a$ and a plurality of elaborate seal flanges $1b1$, $1b2$... $1b9$. The cylindrical surface $1a$ and the seal flanges are concentric about axis revolution 0. The seal flanges are shown as being uniformly spaced along the part 1 in the direction parallel to the axis 0, but it should be understood that the invention is capable of use with any spacing of the seal flanges. The seal flanges $1b1$–$1b9$ may be integrally formed with the part 1, such as by machining, and may be formed of any type of known alloy having the physical and mechanical properties necessary for the operational conditions under which they may be utilized. The process described below for repairing the seal flanges may be utilized with most of the known materials.

As noted previously, the peripheral surfaces or tips of the seal flanges $1b1$ through $1b9$ may become worn by the effects of friction generated by contact against the complimentary sealing surface (not shown) resulting in a roughness and unevenness of the peripheral surface and a reduction of the radial height H of each of the seal flanges. If the radial height h becomes less than the desired height $h_0$, the overall sealing effectiveness of the labyrinth seal becomes insufficient and the seals must be repaired. The process according to the present invention may be utilized when the wear of the seal flanges (i.e. $h_0-h$) is between 0.3 and 0.8 mm for typical diameters encountered in turbojet engine labyrinth seals.

The spin-forming tool 2 used to repair the seal flanges is also shown in FIG. 1. In the particular embodiment illustrated, the spin-forming tool includes a shaft 3 having stop washer 4 attached to one end by screw 5. Stop washer 4 acts as a stop for annular stub shaft 6 which is frictionally connected to shaft 3. Stub shaft 6 defines an annular shoulder $6a$, a cylindrical boss $6b$ and externally threaded section $6c$. Two rollers or knurled washers G1 and G2 are mounted on the cylindrical boss $6b$ and have spacer 7 mounted between them. Locking ring 9 retains the rollers and the spacer in assembled relationship by contact with nut $8a$ and lock nut $8b$ which are both threaded onto externally threaded section $6c$ of the stub shaft 6. Shaft 3 may be formed with, or otherwise attached to end $10a$ of elbow 10. The opposite end $10b$ of elbow 10 may be attached to the tool carrier of the lathe to enable the entire assembly to be moved radially and axially with respect to the rotating part 1.

In order to implement the process according to the present invention, the part 1 having worn seal flanges $1b1$ through $1b9$ is mounted on a lathe (not shown) so as to be rotated about its axis 0. With the spin-forming tool initially located radially displaced away from the peripheries of seal flanges, part 1 is rotated about axis 0 at a suitable speed. The distance between the two rollers G1 and G2 is fixed and set by the spacer 7, which spacer is located opposite the tip or peripheral surface of seal flange $1b1$ in the position in the FIG. 1 and, on a larger scale, in FIG. 2. Obviously, a lathe or other machine must be utilized which is equipped with a member capable of highly accurate motion in both the axial and radial directions to insure the desired results from the process according to the invention. This process may be utilized with either a manually operable lathe, or one which is automatically controlled by a numeric control device.

Figure 2:
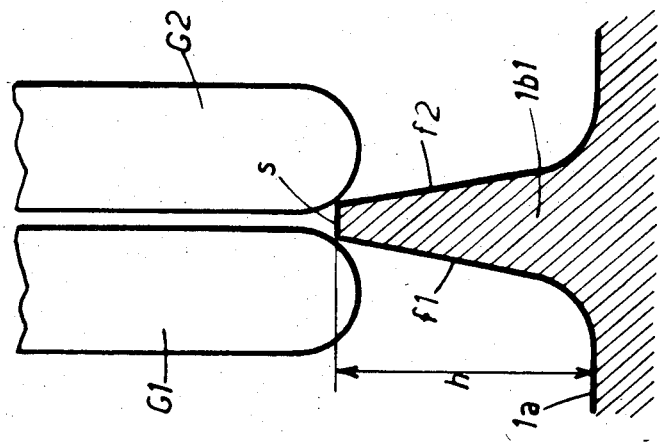
FIG. 2 is a sectional view of an individual sealing flange showing the relationship of the repairing tool in its initial position.

Since the spacing between the rollers G1 and G2 is less than the width of the peripheral surface s of the seal flanges, as the tool 2 is fed radially inwardly, the facing surfaces of the rollers G1 and G2 will contact sides f1 and f2 of the seal flange. Once the rounded portions of the two rollers G1 and G2 have made contact with the lateral extremities of the peripheral surface s of the seal flange, as shown in FIG. 2, the tool 2 is slowly advanced radially inwardly through a distance A (shown in FIG. 3). Typically, this distance A is approximately 1-2 mm, depending on the lathe spinning conditions and the particular material from which the seal flange is made. As clearly shown in FIG. 3, under the influence of the radial advance of the rollers G1 and G2 (which are kept a fixed distance apart), the material of the seal flange $1b1$ creeps outwardly in the radial direction, opposite to the radial advance of the rollers G1 and G2. The sides f1 and f2 of the flange $1b1$ are deformed between the inner sides of the rollers G1 and G2 so as to decrease the distance between the sides f1 and f2, thereby increasing the radial height to a value of h' which is larger than the radial height h of the worn flange. It is to be understood that the process according to the invention is carried out in such a manner that the radial height h' is at least equal to, and preferably slightly larger than the desired finished value $h_0$.

Figure 4:
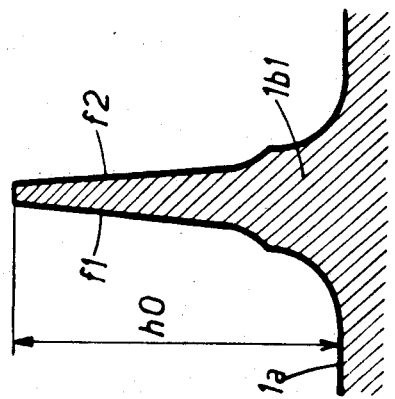
FIG. 4 is a side sectional view of a sealing flange repaired in accordance with the invention.

After advancing rollers G1 and G2 to the maximum distance A, they are retained in that position for a predetermined amount of time (which may be approximately 30 seconds) in order to stabilize the shape of the repaired seal flange. The tool 2 is then radially retracted such that the rollers are removed from contact with the seal flange. When the inner sides of rollers G1 and G2 no longer exert a strong force against the sides f1 and f2, the shape of the sides change to the particular shape shown in FIG. 4, which approximates the shape of a new seal flange.

Once the tool 2 has been radially retracted, it is axially moved to the next seal flange and the operational steps are repeated. These steps are repeated until each of the seal flanges $1b2-1b9$ is repaired. Preferably, the spin-forming operation on each of the seal flanges is undertaken with ample lubrication, such as a soluble oil.

Figure 3:
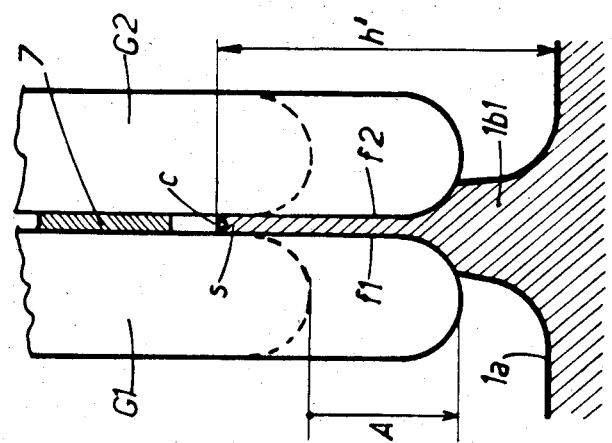
FIG. 3 is a side sectional view of an individual sealing flange showing the repairing tool in its radially innermost position.

After the seal flange has been increased in height by the previously described spin-forming operation, it still may contain defects, such as small craters c in its peripheral surface s (See FIG. 3). Also, pleats or other deformities may be present on sides f1 and f2 due to the compression of the seal flange material under the action of rollers G1 and G2. The defects on the peripheral surface s may be eliminated, where the radial height h' is somewhat larger than the desired height $H_0$, by grinding or otherwise machining down the radial height h' to its desired height $h_0$. The deformities in the sides f1 and f2 can also be eliminated by a honing operation.

The increase in the radial height $(h'-h)$ of the seal flanges which is obtained by the spin-forming procedure depends upon the spacing between the rollers G1 and G2, and the magnitude of the roller advance distance A. Obviously, the spacing between the roller G1 and G2 must be selected as a function of the width of the peripheral surface s of the worn flanges and the thickness of the rollers G1 and G2. This latter is limited only by the spacing between adjacent seal flanges. The rate of advance of the rollers must be made as low as possible to prevent the roller edges from being warped or axially displaced by contact with the wedge-shaped sealing flange. The rate of advance also must be selected according to the hardness of the material being formed. For instance, the rate of advance may be approximately 0.8 to 1 mm/minute for a seal flange material having a hardness equal to or less than 350 HB, and only 0.5 to 0.7 mm/minute for a material having a hardness greater than 350 HB.

The spinning tool 2 may also be mounted so as to be fixed in the axial direction if the part 1, bearing the seal flanges is movable in an axial direction. The process according to the present invention may be also utilized to repair labyrinth seals regardless of their type, such as those which utilize teeth in lieu of annular sealing flanges, or two overlapping sets of teeth, etc.

The foregoing description is provided for illustrative purposes only and should not be construed as in any way limiting the invention, the scope of which is determined solely by the appended claims.

I claim:

1. A process for repairing labyrinth seal flanges having a height $h$ less than a desired height $h_0$ comprising the step of spin-forming each seal flange until the height $h$ is at least equal to $h_0$, 2. The process according to claim 1 comprising the additional steps of:
   (a) mounting a turbojet engine part having labyrinth seal flanges having a height $h$ less than $h_0$ in a lathe;
   (b) rotating the part about a central rotational axis;
   (c) contacting the seal flange with a spin-forming tool; and
   (d) Feeding the spin-forming tool radially inwardly against the sides of the seal flange to cause the height $h$ to increase to at least $h_0$.

3. The process according to claim 2 comprising the additional step of holding the spin-forming tool in its radially innermost position for a predetermined time interval.

4. The process according to claim 3 wherein the seal flanges are spin formed such that their height $h$ is greater than $h_0$ and comprising the additional step of removing material from the periphery of the flange, so as to eliminate any defects therein, until the height $h$ is approximately equal to $h_0$.

5. The process according to claim 4 wherein the peripheral material is removed by grinding.

6. The process according to claim 4 comprising the additional step of finishing the sides of the seal flanges to remove any defects therein caused by the spin-forming tool.

7. The process according to claim 6 wherein the sides of the seal flanges are finished by honing.

8. The process according to claim 7 wherein the peripheral material is removed by grinding.

9. The process according to claim 2 wherein the spin-forming tool has a pair of rollers laterally displaced a distance smaller than the axial width of the seal flange such that, as the spin-forming tool is fed radially inwardly, the sides of the seal flange are compressed thereby increasing the height $h$ of the flange.

* * * * *

UNITED STATES PATENT AND TRADEMARK OFFICE
CERTIFICATE OF CORRECTION

PATENT NO. : 4,606,102

DATED : Aug. 19, 1986

INVENTOR(S) : Jean R. L. Riethmuller

It is certified that error appears in the above-identified patent and that said Letters Patent is hereby corrected as shown below:

Column 1, line 43, change "accomodate" to --accommodate--;

Column 2, line 6, change "suitalbe" to --suitable--;

Column 3, line 8, change"H" to --h--;

Column 4, line 35, change "$H_0$" to --$h_0$--;

Column 5, line 5, change "$h_0$," to --$h_0$.--

Column 5, line 13, change"Feeding" to --feeding--.

Signed and Sealed this

Twenty-third Day of December, 1986

Attest:

DONALD J. QUIGG

*Attesting Officer*  *Commissioner of Patents and Trademarks*